United States Patent [19]

Warren

[11] 4,069,674
[45] Jan. 24, 1978

[54] POWER PLANT

[76] Inventor: Glenn B. Warren, 1361 Myron St., Schenectady, N.Y. 12309

[21] Appl. No.: 759,328

[22] Filed: Jan. 14, 1977

[51] Int. Cl.² .......................... F03G 7/02; F01K 7/34
[52] U.S. Cl. ....................................... 60/641; 60/676; 60/678; 60/667
[58] Field of Search ................. 60/641, 676, 678, 667, 60/670, 652

[56] References Cited

U.S. PATENT DOCUMENTS

| | | | |
|---|---|---|---|
| 2,867,983 | 1/1959 | Armacost | 60/676 X |
| 3,995,429 | 12/1976 | Peters | 60/641 |

*Primary Examiner*—Allen M. Ostrager
*Attorney, Agent, or Firm*—James A. Mitchell; John F. Ahern; Herbert E. Messenger

[57] ABSTRACT

A steam turbine-generator power plant is described wherein solar energy is used to preheat feedwater to a steam generator. Two parallel feedwater supply branches are proposed for preheating the feedwater upstream from the steam generator. A first preheater branch utilizes extraction steam from the steam turbine for preheating feedwater and is called an extraction branch. A second preheater branch utilizes solar energy for preheating feedwater and is called a solar branch. The two branches are joined upstream from the steam generator and the proportion of flow from each branch is based on the temperature difference between the extraction branch and the solar branch. A variable speed pump is used to pump feedwater from the solar branch at a rate proportional to the temperature difference between the two branches.

7 Claims, 1 Drawing Figure

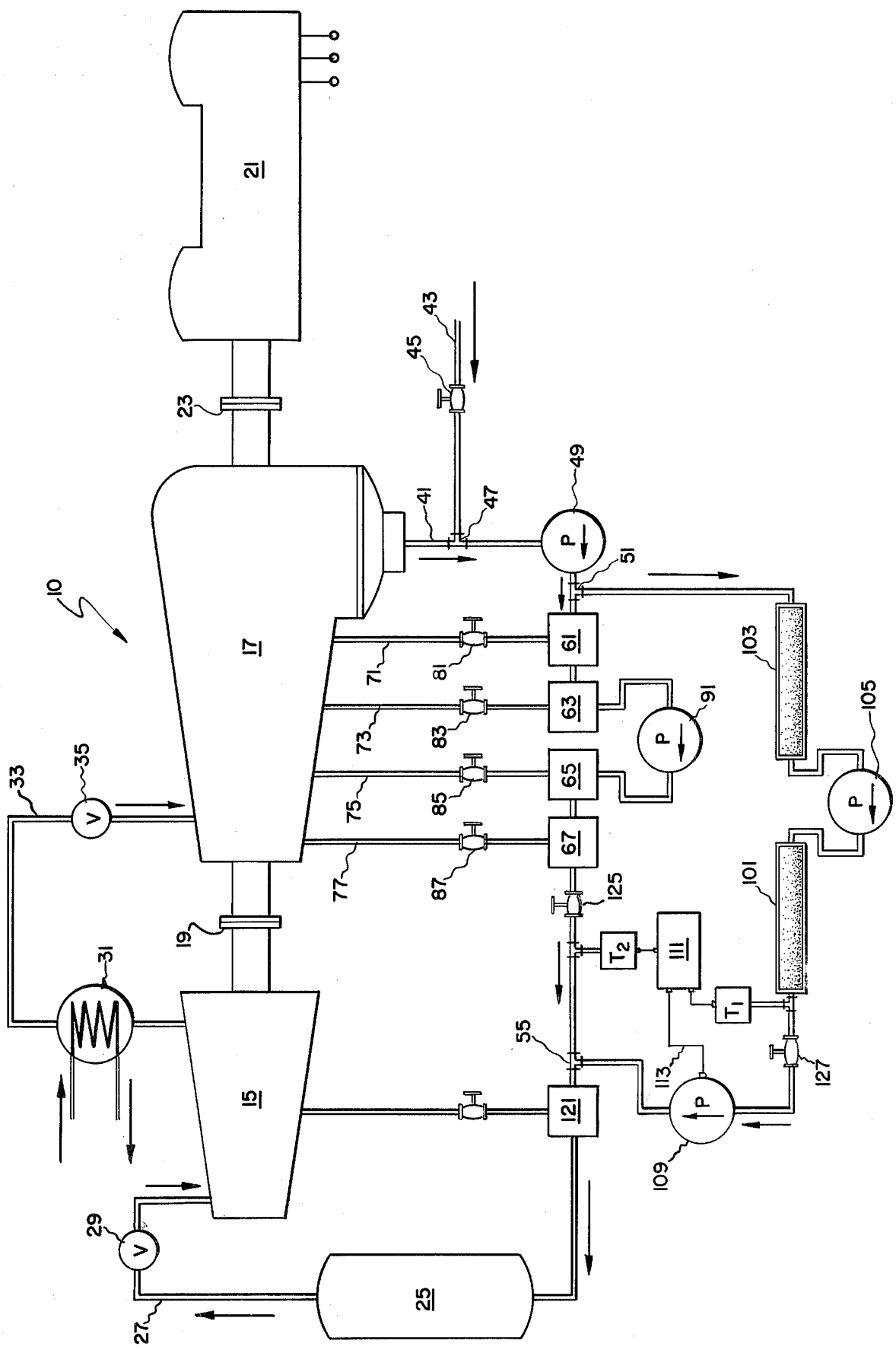

POWER PLANT

BACKGROUND OF THE INVENTION

This invention relates, in general, to steam turbine-generator power plants; and, in particular this invention relates to feedwater preheating by means of solar energy.

In a steam turbine-generator power plant, a steam generator, or boiler, is used to provide steam for driving the steam turbine which in turn, drives the rotor of an electrical generator to produce electricity. Steam which is exhausted from the turbine is thereafter condensed and returned to feedwater. The feedwater is then recirculated to the steam generator where it is reheated to provide more steam. It has been found economical to preheat the feedwater prior to its return to the steam generator using extraction steam from various points on the steam turbine as a heat exchange fluid. Preheating feedwater raises the temperature of the feedwater and thereby decreases the heating requirements in the steam generator resulting in a decrease in fuel requirements in the steam generator. Of course, extraction of steam from the steam turbine decreases the power output of the turbine, but such a power loss is acceptable in terms of satisfying the load demand and preferable in terms of overall plant efficiency.

According to one aspect of the present invention, it has been found that feedwater may be preheated by applying solar heat to the feedwater. Dependent upon ambient conditions, solar energy may be used to preheat feedwater and thereby decrease the extraction steam requirements in a manner to be disclosed as part of the present invention. Since solar energy is available only on an intermittent basis, it is required that a system be devised which will take advantage of available solar energy while maintaining a capability to meet load demand requirements when solar energy is not available.

Hence, it is one object of the present invention to provide a power plant wherein feedwater preheating is augmented or replaced by solar energy.

It is another object of the present invention to provide a power plant wherein solar energy is delivered into the power plant as it becomes available.

It is another object of the present invention to provide a power plant wherein the turbine power output may be increased without an increase in boiler fuel requirements.

It is still another object of the present invention to provide a power plant wherein the turbine power output may remain constant and the boiler fuel requirements decreased.

SUMMARY OF THE INVENTION

According to the foregoing objects of the invention, a steam turbine-generator power plant includes a means for preheating feedwater to the steam generator. Such feedwater preheating means include two parallel preheater branches. A first preheater branch includes a plurality of feedwater preheaters connected in series flow relationship, wherein each preheater is supplied with feedwater and extraction steam in heat exchange relationship. A second solar branch includes at least one solar collector having feedwater passing therethrough so that there exists a heat exchange relationship between the available solar heat and the input feedwater. The total feedwater flow from the turbine condenser and the makeup supply is divided at a first junction upstream from the two parallel branches. The total feedwater flow is rejoined at a second junction downstream from the two parallel branches. The output temperature at each branch is measured. Whenever the output temperature of the solar branch exceeds the output temperature of the extraction branch an auxiliary feedwater pump in the solar branch is energized so as to decrease the flow in the extraction branch. This decrease in extraction branch flow causes a decrease in extraction steam requirements and hence the turbine power output is proportionately increased. The increased turbine power output may be used to satisfy additional load requirements or alternatively, the steam generator firing rate may be cut back while maintaining a constant turbine power output.

The novel features believed characteristic of the present invention are set forth in the appended claims. The invention itself, however, together with further objects and advantages thereof, may be understood with reference to the following description taken in connection with the appended drawing.

BRIEF DESCRIPTION OF THE DRAWING

The drawing shows a schematic diagram of a typical steam turbine generator power plant of the type wherein extraction steam is used to preheat feedwater to a boiler and wherein according to the present invention, the feedwater preheating is further augmented by solar heating.

DETAILED DESCRIPTION OF THE INVENTION

The drawing shows one example of a typical power plant 10 which may include a high pressure turbine 15 and a low pressure turbine 17 arranged in tandem through a mechanical coupling 19. Alternatively, any known arrangement of turbines may be used in combination with the present invention including a single turbine used to drive a load. The two turbines shown are used to drive a load 21 which may be the rotor of an electrical generator, the latter being joined to the output shaft of the low pressure turbine through a mechanical coupling 23.

The motive fluid to drive the high pressure turbine and the low pressure turbine is supplied from a steam generator 25 which delivers steam to the high pressure turbine inlet through a steam line 27. The steam line 27 further includes suitable stop valves and control valves represented schematically by valve 29. Steam exhausted from the high pressure turbine may be reheated in a reheater 31 incorporated into a steam inlet line 33 connected to the inlet end of the low pressure turbine. Steam inlet line 33 also contains suitable stop valves and control valves schematically illustrated by valve 35.

At the output end of the low pressure turbine the exhaust steam is condensed whereupon the condensate is returned to the feedwater input through condensate line 41. Additional feedwater may be input into the feedwater supply through supply line 43 having a shut-off valve 45 whereas the condensate and make-up feedwater are joined at a pipe junction 47. Condensate pump 49 delivers the total feedwater flow to a second pipe junction 51. At junction 51, the feedwater flow is divided, in a manner to be described, between two parallel flow paths, namely an extraction branch and a solar branch. The two parallel branches are rejoined downstream at a third pipe junction 55.

A first branch or extraction branch may be comprised of any suitable number (four shown) of feedwater preheaters 61, 63, 65 and 67 connected with one another in a series flow relation. Each preheater receives an extraction steam flow from the low pressure turbine 5 through extraction steam lines 71, 73, 75 and 77 respectively. Each extraction steam line contains a non-return valve 81, 83, 85 and 87 respectively. Each extraction preheater is a heat exchanger which passes extraction steam in a heat exchange relation to the feedwater flow, the preheaters being non-contact or direct contact heat exchangers or any combination thereof. The amount of extraction steam withdrawn from the turbine is a function of the total feedwater flow volume and the feedwater temperature. Nonreturn valves 81, 83, 85 and 87 prevent the "flash back" of steam into the turbine from their respective preheaters in the event of a sudden loss of turbine load. A decrease in feedwater flow causes a decrease in extraction flow. The feedwater flow is maintained by means of a main boiler feed pump 91 which may be driven through a separate drive (not shown) for variable speed control. The speed of the main broiler feed pump is in turn controlled by a conventional and well known system which responds to boiler demand for feedwater. If the boiler demand is augmented from the solar branch, then the main feedwater pump speed will decrease.

A second parallel branch or solar branch is comprised of at least one solar heater; or, as shown in the preferred embodiment, may be alternatively comprised of a plurality of solar heaters 101 and 103 respectively. The solar heaters may be comprised of collector plates (not shown) through which the feedwater is passed. The solar heat energy may be directly or reflectedly absorbed on the collector plates so that a heat transfer takes place between the absorbed solar heat and the feedwater passing through the collector plates. A pump 105 is provided between the downstream (higher temperature) collector and the upstream (low temperature) collectors to increase the pressure in the downstream collector so that increased temperatures may be achieved without steaming in the solar collector.

The feedwater flow through the solar branch is controlled by an auxiliary feedwater pump 109 at the downstream side of the solar heaters. Pump 109 is a variable speed pump which is responsive to the feedwater temperature difference between the feedwater temperature measurement at the outlet end of the solar heaters $T_1$ and the temperature measurement taken at the outlet end of the extraction preheater branch $T_2$. The output temperatures are compared in a controller 111 and a resultant speed signal is input into the drive means (not shown) of pump 109 through line 113. The controller 111 can be an electronic, hydraulic, or mechanical device which compares input temperature signals $T_1$ and $T_2$ and produces an output speed signal in line 113 proportional to the difference. The temperature measurements $T_1$ and $T_2$ are taken upstream from pipe junction 55 and jump 109 is also upstream from junction 55. As the temperature $T_1$ exceeds the temperature $T_2$ feedwater is taken from the solar branch to augment or replace the feedwater output of the extraction branch. The combination of the pump 109, temperature sensors $T_1$ and $T_2$; and, the controller 111 comprises a means for proportioning the feedwater flow between the extraction branch and the solar branch.

A buffer extraction steam feedwater heater 121 is included between the junction 55 and the steam generator 25 to stabilize the temperature of the incoming feedwater to the steam generator thus obviating small temperature fluctuations which may occur in the feedwater due to momentary differences in available solar heat due to atmospheric conditions such as passing clouds. Moreover, the additional feedwater heater will provide a higher feedwater temperature and increase efficiency.

Finally, non-return valves 125 and 127 protect their respective heater branches against backflow while also permitting the proper operation of pump 91. Moreover, valve 127 protects heater 101 from being subjected to full boiler feedwater pressure and temperature should the driver (not shown) of pump 109 shut down.

The operation of the present invention will be described under two conditions; namely, when the turbine output is increased while the steam generator firing rate remains constant; and, the turbine output remains constant while the steam generator firing rate is decreased. Under the first condition, increased output at a constant firing rate, as the solar branch temperature $T_1$ increases above the feedwater branch temperature auxiliary pump 109 will be activated. The controller 111 can be preset in a conventional manner so that auxiliary pump 109 will not be actuated until $T_1$ exceeds $T_2$ by a preselected buffer temperature, e.g. 20° F. This will ensure that the input from the solar branch will provide a significant heat input and prevent undue cycling of the pump 109. The solar branch output at a higher temperature and pressure than the extraction branch output will cause the flow through the extraction branch to decrease proportionately and hence decrease the extraction requirements into the extraction branch thus adding to the power output of the turbine by the amounts of extraction steam which now may be retained in the turbine. As $T_1$ increases above $T_2$ the pumping rate of auxiliary pump 109 proportionately increases until all extraction requirements from turbine 17 are ceased. The steam generator firing rate remains the same. In an electrical power plant it must be recognized that the increased power output of the turbine must be matched to an increased load demand and hence the aforesaid mode of operation is particularly useful in day time peaking applications wherein neither the electrical generator nor the turbine is design limited so that it cannot utilize the additional power output.

The second mode of operation wherein the turbine output remains constant and the steam generator firing rate is decreased to conserve fuel is particularly useful in retrofit applications wherein design limitations or demand requirements cannot be matched to an increase in turbine output. In this case, as the extraction requirements of turbine 17 are decreased, the steam input to turbine 17 is also throttled back thereby allowing a decrease in the steam generator output such that the firing rate of the steam generator may be cut back and fuel is thereby conserved.

In summation, a solar heat branch is added to a conventional turbine-generator power installation in order to utilize available solar heat to displace extraction steam requirements. The applied solar branch inputs solar heated feedwater to displace extraction branch feedwater at a rate proportional to the temperature difference between the extraction branch output and the solar branch output. This input solar feedwater is delivered by an auxiliary pump which responds to a controller which receives the temperature inputs. Under the aforedescribed methods of operation, in both modes, the extraction requirements are decreased to increase the turbine power output. However, in the peaking application, the increased output of the turbine is utilized to increase the electrical output of the plant without decreasing the steam generator firing rate whereas in the fuel conservation mode, as the extraction demand decreases, the input steam is throttled back so that the turbine power output remains the same but the firing rate of the steam generator is decreased.

While there has been shown what is considered, at present, to be a preferred embodiment of the invention, other modifications may occur to those skilled in the art. Such modifications may include using the present invention on only one turbine or in a different arrangement of turbines. It is intended to cover in the appended claims all such modifications as fall within the true spirit and scope of the invention.

What is claimed is:

1. A power plant comprising a steam turbine which drives a load, a steam generator providing steam to said steam turbine and a feedwater preheating system for supplying preheated feedwater to said steam generator, said feedwater preheating system comprising:
    an extraction branch including at least one preheater, said preheater being fluidly connected to said turbine through a steam extraction line whereby feedwater may be preheated by extraction steam;
    a solar branch at least one solar heat exchanger, said solar heat exchanger providing a heat exchange relationship between available solar heat and the feedwater whereby feedwater may be preheated by solar heat;
    a first flow divider junction upstream from said extraction branch inlet and said solar branch inlet whereby feedwater is divided between at least two branches;
    a second flow junction downstream from said extraction branch outlet and said solar branch outlet whereby the feedwater flow is rejoined upstream from said steam generator; and,
    means for proportioning the feedwater flow between said extraction branch and said solar branch whereby the solar branch flow is increased and the extraction branch flow is decreased during periods when solar heat is available.

2. The power plant recited in claim 1 wherein the flow proportioning means comprises:
    a first thermal sensor means at the outlet end of said solar branch;
    a second thermal sensor means at the outlet end of said extraction branch;
    pump means downstream from said first thermal sensor means and upstream from said second junction; and,
    means for controlling the operation of the pump means in accordance with the feedwater temperature difference at the outlet ends of the extraction branch and the solar branch.

3. The power plant recited in claim 1 further comprising a preheater downstream from said second junction and upstream from said steam generator whereby extraction steam from said turbine may be applied to said feedwater flow after it has been rejoined downstream from said branches.

4. The power plant recited in claim 1 wherein the solar branch includes a plurality of solar heat exchangers connected in series through a pressure feed pump whereby the downstream solar heat exchanger is at a higher temperature than the next upstream solar heat exchanger.

5. The power plant recited in claim 2 wherein the control means is programmed to actuate the pump means whenever the solar branch temperature exceeds the extraction branch temperature by a predetermined temperature difference.

6. The power plant recited in claim 5 wherein the pump means is oriented at a variable speed increasing proportionately with the increasing temperature difference between the extraction branch temperature and the solar branch temperature.

7. In a power plant of the type wherein a steam turbine is connected to drive a load, said steam turbine being supplied with steam from a steam generator which, in turn, is fluidly connected to a feedwater supply; means are provided for preheating feedwater upstream from said steam generator said means comprising:
    an extraction branch including a plurality of preheaters, each preheater being fluidly connected in a heat exchange relation with said steam turbine whereby extraction steam may be used to preheat feedwater to the steam generator;
    a solar branch including a plurality of solar heat exchangers, each solar heat exchanger providing a heat exchange relation between available solar heat and the feedwater flow;
    a first junction upstream from said extraction branch inlet and said solar branch inlet whereby the feedwater may be divided between at least two branches;
    a second junction downstream from said extraction branch outlet and said solar branch outlet whereby the feedwater flow is rejoined upstream from said steam generator;
    a first thermal sensor means at the outlet end of said solar branch;
    a second thermal sensor means at the outlet end of said extraction branch; and,
    pump means downstream from said first thermal sensor means and upstream from said second junction; and,
    control means for actuating said pump means whenever the solar branch temperature exceeds the extraction branch temperature whereby the extraction branch flow is decreased and the solar branch flow is increased by an amount proportional to the temperature difference.

* * * * *